(12) United States Patent
Clapp et al.

(10) Patent No.: US 8,520,286 B2
(45) Date of Patent: Aug. 27, 2013

(54) COLORED FLUIDS FOR ELECTROWETTING, ELECTROFLUIDIC, AND ELECTROPHORETIC TECHNOLOGIES

(75) Inventors: Lisa Clapp, Kobe (JP); Russell Schwartz, Cincinnati, OH (US); Stan Vilner, South Lebanon, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 13/516,995

(22) PCT Filed: Dec. 20, 2010

(86) PCT No.: PCT/US2010/061287
§ 371 (c)(1),
(2), (4) Date: Aug. 15, 2012

(87) PCT Pub. No.: WO2011/075720
PCT Pub. Date: Jun. 23, 2011

(65) Prior Publication Data
US 2012/0307347 A1  Dec. 6, 2012

Related U.S. Application Data

(60) Provisional application No. 61/287,933, filed on Dec. 18, 2009.

(51) Int. Cl.
*G02F 1/153* (2006.01)
*G02B 26/00* (2006.01)
*G02B 5/23* (2006.01)

(52) U.S. Cl.
USPC ............ 359/270; 359/296; 359/665; 252/586

(58) Field of Classification Search
USPC .................. 359/265–275, 665–667; 252/586
See application file for complete search history.

(56) References Cited

U.S. PATENT DOCUMENTS

| | | | |
|---|---|---|---|
| 6,727,318 B1 * | 4/2004 | Mathauer et al. | 524/801 |
| 6,805,817 B2 | 10/2004 | Zhang et al. | |
| 7,176,255 B2 * | 2/2007 | Mathauer et al. | 524/801 |
| 7,176,317 B2 * | 2/2007 | Banning et al. | 546/196 |
| 7,276,188 B2 | 10/2007 | Do et al. | |
| 7,430,073 B2 * | 9/2008 | Chopra et al. | 359/296 |
| 7,433,113 B2 * | 10/2008 | Chopra et al. | 359/296 |
| 7,502,161 B2 * | 3/2009 | Chopra et al. | 359/296 |
| 7,872,790 B2 * | 1/2011 | Steckl et al. | 359/253 |
| 2001/0046081 A1 | 11/2001 | Hayashi et al. | |
| 2003/0096113 A1 | 5/2003 | Jacobson et al. | |
| 2003/0203987 A1 | 10/2003 | Nomoto et al. | |
| 2007/0195402 A1 | 8/2007 | Miyazawa | |
| 2008/0297880 A1 | 12/2008 | Steckl et al. | |

\* cited by examiner

*Primary Examiner* — Evelyn A. Lester
(74) *Attorney, Agent, or Firm* — Frost Brown Todd LLC (57) ABSTRACT

Colored fluids for electrowetting, electrofluidic, and electrophoretic chromatophore devices are disclosed. In one embodiment, the colored fluid includes at least one solvent and at least one oligomeric and/or polymeric dye in the solvent. The oligomeric dye has at least one chromophore attached to one or more oligomeric chains, and the polymeric dye has at least one chromophore attached to one or more oligomeric and/or polymeric chains. The dye also has a molecular weight from 400 to 100,000, solubility in the solvent of at least 5% wt at 25° C., and a dynamic viscosity from 0.5 cPs to 2,000 cPs at 25° C. The solvent may be polar or non-polar each having specific properties defined.

21 Claims, 3 Drawing Sheets

COLORED FLUIDS FOR ELECTROWETTING, ELECTROFLUIDIC, AND ELECTROPHORETIC TECHNOLOGIES

CROSS REFERENCE TO RELATED APPLICATIONS

This application is a National Stage Entry of International Application No. PCT/US2010/061287, filed on Dec. 20, 2010 and claims the benefit of U.S. Provisional Application No. 61/287,933, filed Dec. 18, 2009, both of which are hereby incorporated by reference in their entirety for all purposes as if fully set forth herein.

TECHNICAL FIELD

The present invention relates generally to the field of electrowetting, and more specifically to colored fluids for electrowetting, electrofluidic, or electrophoretic devices and to electrowetting, electrofluidic, and electrophoretic devices.

BACKGROUND

Interfacial tension between two immiscible fluids can be controlled by electrical potential. This basic principle is used in a diverse and continuously growing group of electro-optical modulated displays that include devices in which the optical state of an imaging material is modulated or changed by subjecting the imaging material to an electric field or the transport of electrons, for example, electrowetting, electrophoretic or electrochromic devices.

Electrowetting has become an attractive modulation scheme for a variety of optical applications due in part to a desirable combination of high brightness and contrast ratio, a large viewing angle, and a fast switching speed. In addition, the power consumption of electrowetting displays is relatively low because they do not require front or backlighting. For example, electrowetting has been used to provide optical switches for fiber optics, optical shutters or filters for cameras and guidance systems, optical pickup devices, optical waveguide materials, and video display pixels. The term "electrowetting" describes the effects of an electric field on the contact angle of a liquid with a hydrophobic surface. With an electric field, the liquid distributes over, or wets, a surface that initially repels the liquid resulting in a change in the spectral properties of a device. When the electric field is removed, the contact angle increases and the liquid contracts into an area whereby the spectral properties are returned to the initial state.

Early electrowetting systems employed water and mixtures of water and other polar solvents. However, the physical properties of water, such as expansion at higher temperature and freezing point, limit the applications for such devices. To overcome problems associated with the use of water, other solvents, such as glycols, propylene carbonate, diethylcarbonate, diacetone alcohol, cyclohexanone, butylacetate, propylacetate, gamma-butyrolactone, ethylhexanol, and ionic fluids, have been proposed to replace water. Commonly used non-polar solvents include alkanes such as decane, dodecane, and tetradecane, fluoroalkanes, aromatic and partially hydrogenated aromatic hydrocarbons, heterocyclic aromatic compounds, higher alcohols and carboxylic acids, and silicone oils.

Colored immiscible fluids are an indispensable part of electrofluidic and electrowetting devices, where reproduction of visual information and effects are required for the application. Conventional electrowetting devices typically have a colored oil that forms a film over an insulating fluoropolymer. This colored oil film imparts a visible color to the device. When a voltage is applied between a water layer situated above the oil film and an electrode beneath the insulating fluoropolymer, the oil film is disrupted as water electrowets the surface. The disrupted oil film no longer provides color to the device. Once the voltage is removed, the oil preferentially wets the insulating fluoropolymer, the oil film is reformed, and the color is again evident.

In general, the colorant can be a dye or a pigment. The dye is soluble in application media. That is, it is dispersed in the solvent to the molecular level or relatively small clusters (associates), for example dimers, trimers, tetramers and so on. The pigment is essentially insoluble in application media and exists in the form of particular dispersion. Historically, dyes have been the colorant of choice for various digital applications such as inkjet inks, color filters and electrowetting devices. This fact is not difficult to understand given the great variety of products demonstrating a range of vivid and intense colors, low viscosity of solution, excellent transparency and stability of colored fluids. Dyes however have certain disadvantages including poor light and weather fastness. Other disadvantages include high cost, especially for purified forms, inadequate solubility in non-polar solvents, low resistance to bleed, and/or a lack of opacity. In applications where dyes have been employed as coloring agents, organic pigments have been finding increased utility in recent years due to desirable light fastness and resistance to solvents and bleed. Pigments, on the other hand, are less transparent and stabilization of the pigment dispersion is always a serious concern.

While the problems associated with the use of water and other solvents, and colorants, are being addressed, there still remains a clear need for improved colored fluids for a variety of electrowetting, electrofluidic, and electrophoretic devices.

It would thus be beneficial to provide an improved colored fluid for electrowetting, electrofluidic, or electrophoretic devices that, for example, demonstrates minimal or no negative impact on device components, can enhance device performance, and maintain a desired function over a preferred period of time.

SUMMARY

The embodiments of the invention provide colored fluids for an electrowetting, electrofluidic, or an electrophoretic device.

In one embodiment, the colored fluid includes at least one polar or non-polar solvent and at least one oligomeric and/or polymeric dye in the solvent. The oligomeric dye has at least one chromophore attached to one or more oligomeric chains, and the polymeric dye has at least one chromophore attached to one or more oligomeric and/or polymeric chains. The dye also has a molecular weight from 400 to 100,000, solubility in the solvent of at least 5% by wt at 25° C., and a dynamic viscosity from 0.5 cPs to 2,000 cPs at 25° C. If the solvent is the polar solvent, the colored fluid has a conductivity from about 0.1 µS/cm to 3000 µS/cm, a surface tension of 15 dynes/cm to 90 dynes/cm at 25° C., and a total content of monatomic ions with radii smaller than 2.0 Å and polyatomic ions with radii smaller than 1.45 Å less than 500 ppm. If the solvent is the non-polar solvent, the colored fluid has a conductivity less than $5 \times 10^{-3}$ µS/cm and a surface tension of 10 dynes/cm to 40 dynes/cm at 25° C. The colored fluid can optionally include a pigment. The colored fluid defines a colored polar and/or colored non-polar fluid.

In another embodiment, an electrowetting or electrofluidic device includes the colored polar and/or colored non-polar fluid. In another embodiment, an electrophoretic device includes the colored non-polar fluid. In still another embodiment, a pixel for a display includes the colored polar and/or a colored non-polar fluid.

In yet another embodiment, a method for changing a display state of a pixel for a display is provided. The method includes applying a potential difference to a reservoir of the pixel, which includes the colored polar and/or a colored non-polar fluid, via a plurality of electrodes to create a change in the display state of the pixel by moving or changing the shape of the colored fluid.

The use of such colored fluids in display technologies offers improvements in durability, and provides higher levels of chroma and an ability to achieve higher contrast ratios through dyes and pigment selection. The colored fluids can also provide fast switching speeds, low power consumption, and greater device durability.

DETAILED DESCRIPTION OF SPECIFIC EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed", "comprised" or variants thereof are used in either the detailed description or the claims, such terms are intended to be inclusive in a manner similar to the term "comprising."

The present invention is directed to colored fluids for electrowetting, electrofluidic, or electrophoretic devices. Electrowetting and electrofluidic devices are typically composed of hydrophobic dielectrics and electrodes, and may include other hydrophilic surfaces. In general, the substrates and connected features are exposed to a polar fluid and a non-polar fluid, with at least one being colored and which are not miscible or emulsifiable with each other. Electrophoretic devices typically include only colored non-polar fluids, which include charged particles. The polar and/or non-polar fluids used in the devices of the invention can contain an oligomeric and/or polymeric dye and can have attributes of specified electrical conductivity, as well as desirable viscosity, freezing point, and boiling point characteristics, and also reduce or eliminate performance-damaging ions that can exhibit a negative impact on dielectric substrate and other components of the devices. The oligomeric and/or polymeric dyes should not diffuse from one the phase to other or foul the surfaces of the device.

In accordance with embodiments of the present invention, the colored fluid for use with electrowetting or electrofluidic devices can generally include at least one polar solvent, at least one oligomeric and/or polymeric dye in the solvent, and optionally organic or inorganic pigments or surface modified pigments made by a method of chemical modification by covalently attaching ionic, nonionic, or polymeric groups to the pigment surface, as well as optionally a surfactant, synergist, additive for electrical conductivity control, dispersant, biocide, defoamer and other functional additives known those the skilled in the art. The colored fluid defines a colored polar fluid.

In another embodiment, the colored fluid for use with electrowetting, electrofluidic, or electrophoretic devices can generally include at least one non-polar solvent, at least one oligomeric and/or polymeric dye in the solvent, and optionally organic or inorganic pigments or surface modified pigments made by method of chemical modification by covalently attaching nonionic low molecular weight or oligomeric or polymeric groups to the pigment surface, as well as optionally a surfactant, synergist, dispersant, other additives known in the art, or any combination thereof. The colored fluid defines a colored non-polar fluid.

The polar solvent of the invention may be an individual solvent or any combination of two or more solvents. Non-limiting examples of the polar solvent include water, glycols, polyglycols, alcohols, polyols, ethers, esters, ketones, ketals, lactones, lactams, pyrrolidones and polyvinylpyrrolidones, pyrrolidines, carbonates, sulfones, sulfoxides, amines, amides, imines, nitriles, carboxylic acids, acetals, carbamates, ureas, aldehydes, halogenated, thio, or nitro compounds, ionic fluids, or any mixtures thereof.

The polar solvents may exhibit a dielectric constant greater than 10 at 25° C. In another example, the dielectric constant is greater than 30 at 25° C.

The dynamic viscosity of the polar solvent can be less than 2000 cP at 25° C. In another example, the dynamic viscosity is from 0.1 cP to 2000 cP at 25° C. In yet another example, the dynamic viscosity is from 0.1 cP to 500 cP at 25° C.

The polar solvent also can demonstrate an electrowetting relative response (EWRR) to direct or alternating current of 30V in the range of 20-80%. EWRR is defined here according to the following formula:

$$EWRR = (\Theta_0 - \Theta_V) \times 100 / \Theta_0, \%$$

wherein $\Theta_0$ is the initial contact angle at a voltage of 0V; $\Theta_V$ is the final contact angle at a voltage of 30V. A suitable procedure for measurement of contact angles is described in Balaji Raj et al., "Ion and Liquid Dependent Dielectric Failure in Electrowetting Systems", Langmuir|3b2|ver. 9|Aug.

13, 2009, the contents of which is incorporated by reference herein in its entirety, and is further discussed in detail below under test procedures.

The non-polar solvent of the invention may be any liquid or combination of two or more liquids. Non-limiting examples of non-polar solvents include non-substituted linear and branched alkanes and their derivatives, for example, halogenated alkanes, substituted and unsubstituted aromatic hydrocarbons and partially hydrogenated aromatic hydrocarbons, fatty alcohols and carboxylic acids, esters, and amides, or any mixtures thereof. The non-polar fluid in the device can be immiscible with the polar fluid and the components dissolved in this liquid may not migrate into the polar liquid.

The non-polar solvents may exhibit a dielectric constant less than 10 at 25° C. In another example, the dielectric constant is less than 5 at 25° C.

The dynamic viscosity of the non-polar solvent can be less than 2000 cP at 25° C. In another example, the dynamic viscosity is from 0.1 cP to 2000 cP at 25° C. In yet another example, the dynamic viscosity is from 0.1 cP to 500 cP at 25° C.

For purposes herein, the oligomeric dye is defined as a compound including at least one chromophore attached to one or more oligomeric chains directly or through linking groups by means of covalent or ionic bonds and having a total molecular weight in a range of 400 to 5,000. The polymeric dye is defined as a compound including at least one chromophore attached to one or more oligomeric and/or polymeric chains directly or through linking groups by means of covalent or ionic bonds and having a total molecular weight in a range of 5,000 to 100,000.

In one embodiment, the oligomeric and polymeric dyes of the invention can be defined by one or more of the following general formulas:

$$Q[X-(Y)_l]_m \qquad (1)$$

$$(Q-X)_p-Z-(X-Y)_q \qquad (2)$$

$$(Q\text{-}X)_p(X-Y)_q Z-Y-Z(X-Y)_q(X\text{-}Q)_p \qquad (3)$$

$$(Q\text{-}X)_p(X-Y)_q Z\text{-}L\text{-}Z(X-Y)_q(X\text{-}Q)_p \qquad (4)$$

$$Q\text{-}X-Y-X\text{-}Q \qquad (5)$$

$$Z(X-Y-X\text{-}Q)_p \qquad (6)$$

$$[(Y)_l X]_m Q\text{-}X-Y-X\text{-}Q[X(Y)_l]_m \qquad (7)$$

$$X\text{-}Q\text{-}X-Y-[X\text{-}Q\text{-}X-Y]_k-X\text{-}Q\text{-}X-Y \qquad (8)$$

$$Y(-X\text{-}Q)[Y(-X\text{-}Q)]_k Y(-X\text{-}Q)Y \qquad (9)$$

$$Q[X_1^- Y_1^+]_m \qquad (10)$$

$$Q[X_2^+ Y_2^-]_m \qquad (11)$$

$$[Y_1^+ X_1^-]_m Q\text{-}X-Y-X\text{-}Q[(X_1^- Y_1^+]_m \qquad (12)$$

$$[Y_2^- X_2^+]_m Q\text{-}X-Y-X\text{-}Q[X_2^+ Y_2^-]_m \qquad (13)$$

$$Z\{X-Y-X\text{-}Q[X_1^- Y_1^+]_m\}_p \qquad (14)$$

$$Z\{X-Y-X\text{-}Q[X_2^+ Y_2^-]_m\}_p \qquad (15)$$

Q represents a chromophore that can be selected from an azo or azo condensed compound, metal complexes, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethanes such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones, naphthaquinones, and anthraquinones; rhodamines, phthalocyanines, neutrocyanines, diazahemicyanines, porphirines, perinones, perylenes, pyronins, diketopyrrolopyrroles, indigo, indigoids, thioindigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones and any combinations thereof. Q can also represent a residue of any acid, direct, reactive, mordant, solvent, natural, disperse, basic (cationic), sulfur, fluorescent, food, optical brightener, or vat dye, or a pigment.

Chromophores demonstrating higher light fastness and higher molar extinction coefficient are more desirable.

X represents R; RC(O)O; ROC(O); RC(O)NR$_1$; RNR$_1$C(O); SO$_2$NR$_1$; SO$_2$; RO; RS; RNR$_1$; =N—; RNHC(O)NR$_1$; RNHC(O)O; ROC(O)NH; RC(O)OCH$_2$CH(OH)CH$_2$; ROCH$_2$CH(OH)CH$_2$; or RNR$_1$CH$_2$CH(OH)CH$_2$, where R=a single bond, alkyl, aryl, alkylaryl, or a heterocycle and R$_1$=H, alkyl, aryl, or alkylaryl.

Y is an oligomer or polymer selected from any polyvinyl, polyvinylidene, polydiene, polyalkylene, polyanhydride, polyalkyleneglycol, polyalcohol, polyester, polyepoxy, polyurethane, polyamine, polyimine, polyamide, polyimide, polyuria, polycarbonate, polyacetal, polysulfone, polyaldehyde, polyketone, or any random, block or grafted co-polymer thereof.

Z represents a radical of 1,3,5- and 1,2,4-triazine, benzene-1,3,5-tricarboxylic acid, benzene-1,2,4-tricarboxylic acid, benzene-2,3,5,6-tetracarboxylic acid, glycerol, pentaerythritol, dimethylol propionic acid, citric acid, isocitric acid, propane-1,2,3-tricarboxylic acid, mucic acid, malic acid, tartaric acid, 2,4-dihydroxybenzoic acid, 1,3,5-triaminobenzene, 1,3,5-trihydroxybenzene, gallic acid, 2-amino-1,3-propanediol, or triethanolamine.

L represents a single bond, a bifunctional linking group such as a residue of aliphatic, alicyclic, aromatic, or heterocyclic diols, diamines, dicarboxylic acids or their halogenides, diepoxy, diisocyanates, or disulfochlorides, or any combination thereof.

X$_1^-$ represents an anionic group of the chromophore, Q, such as sulfonic, phosphonic, or carboxylic, and X$_2^+$ represents a cationic group of the chromophore, Q, such as ammonium, phosphonium, sulfonium.

Y$_1^+$ represents a cationic group of the oligomer or polymer, Y, such as ammonium, phosphonium, or sulfonium, and Y$_2^-$ represents an anionic group of the oligomer or polymer, Y, such as sulfonic, phosphonic, or carboxylic.

l is 1-2; m is 1-8; p and q are 1-4; p+q<5; and k is 0-500.

In one example, the dye is an oligomeric dye defined by general formula (1), $Q[X-(Y)_l]_m$, where Q can be a residue of copper phthalocyanine, benzimidazolone, dioxazine, perylene, diketopyrrolopyrroles, quinacridone, or an anthraquinone pigment; X=SO$_2$NR (where R is H) or RC(O)O (where R is a single bond); l is 1; m is 1-3; and Y is a polyethoxylated or a polyalkylene oligomeric chain with a molecular weight from 300-3000. In another example, the dye is a fluorescent dye.

The oligomeric and polymeric dyes of the invention can be synthesized by reacting monomers and oligomers, for example, with the following starting compounds:

$$Q\text{-}[X_1]_m,$$

where $X_1$ represents $RNHR_1$; RCOOH; RCOCl; ROH, RSH, $RSO_2Cl$; $RSO_3H$; RHal; $ROC(O)R_1Hal$; $RNHCOR_1Hal$; $R_1CH=CH_2$; RNCO; RCHO, epoxy, amide, imide, carboxylic acid anhydride, and any combination thereof, with Q, R, and $R_1$ as defined above and Hal represents F, Cl, Br, or I.

Reactive monomers and oligomers suitable for synthesis of the dyes of the invention can contain one or more vinyl, hydroxyl, carboxyl, anhydride, halogen, mercapto, alkoxy, epoxy, isocyanato, amide, imide, sulfonic, phosphonic, primary, secondary, tertiary or quaternary amino groups, or any combination thereof.

The oligomeric and polymeric dyes of the invention can be used for fluid coloration and as pigment dispersants immediately after synthesis without additional purification if the specified above conditions with respect to conductivity and ion content are fulfilled. However, purified dyes provide overall better fluid performance and more desirable long term device performance. Any appropriate techniques are suitable for purification of the oligomeric and polymeric dyes. Non-limiting examples include chromatographic separation, precipitation from solution by solvent replacement, extraction, sublimation, centrifugation, distillation, re-crystallization, fractional crystallization, ultrafiltration, reverse osmosis, or any combination thereof.

With respect to the solubility in the polar and non-polar solvents, the dyes of the invention demonstrate solubility at least 5% by wt in the solvent. In another example, solubility is higher than 10% by wt. In yet another example, solubility is higher than 20% by wt.

The oligomeric and polymeric dyes can also contain additional functional groups. Non-limiting examples of these functional groups are alkyl, aryl, alkylaryl, halogen, nitro, nitrozo, cyano, thio, amino, alkylamino, hydroxyl, carboxylic, aldehyde, anhydride, amide, sulfonamide, salts of carboxylic and sulfonic acids, or any combination thereof.

The oligomeric and polymeric dyes utilized with the colored polar fluids may contain polar groups; however, non-ionic polar groups are understood to be more desirable because they are less influenced by electrical field.

The oligomeric and polymeric dyes utilized with the colored non-polar fluids should be devoid of any groups, ions/counter ions, or impurities that could increase conductivity of the fluid over $5 \times 10^{-3}$ μS/cm. Higher conductivity can have a negative effect on fluid and device performance.

The content of oligomeric and/or polymeric dyes in the colored polar or non-polar fluids can be in the range from about 0.01% weight to about 50% weight, based on the total weight of the fluid. Dye concentration below 0.01% weight may not provide the desired color intensity, and above 50% weight may result in very dark color and inadequate rheological behavior. In one example, the content of oligomeric and/or polymeric dyes in the polar or non-polar fluid is in a range from about 1% weight to about 30% weight.

The pigment that can be included in the polar and non-polar fluids can include any organic pigment belonging to an azo and azo condensed, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, naphthalimide, quinophthalone, isoviolanthrone, pyranthrone pigments, or carbon black, or any combination and solid solution thereof.

The pigment can be any inorganic pigment such as metal oxide, mixed metal oxide, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, bismuth vanadate, or derivatives thereof.

The pigment can also be any known extenders, for example carbonates, sulfates, phosphates, and can be synthetic or mineral.

The pigment may also be a dispersed polymer, such as polystyrene, polyamides, polysulfones, or polysulfides. The pigment also can be any mixture of organic, inorganic pigments and extenders, and solid solutions thereof. In addition, the pigment may be any encapsulated organic or inorganic pigment or extender, or shell type pigment with inorganic nuclei covered with organic shell and vice versa.

The pigment may be a surface modified pigment made by methods of chemical modification by covalently attaching ionic, nonionic, or polymeric groups to the pigment surface. Non-limiting examples of modifying groups are carboxy, sulfonic, phosphate, hydroxyl, polyalkylenglycol, polyalkylene, polyamide, and polyester-groups, or any combinations thereof.

Pigment particles can have a mean weight diameter from dynamic light scattering particle size analysis ranging from about 10 nm to about 5 μm. In another example, particle size is in a range of 20-300 nm.

The pigment content of the polar or non-polar fluid can be in the range from 0% weight to 50% weight, based on the total weight of the pigmented fluid. In one example, the pigment content is in the range from about 0.1 wt % to 50 wt %, based on the total weight of the colored fluid. In another example, the pigment content is in the range from about 1 wt % to about 20 wt %, based on the total weight of the colored fluid. Pigment concentrations below 0.1 wt % will usually not provide color contribution, and above 50 wt % will not electrowet effectively.

The surfactant that can be included in the colored fluid can be any anionic, cationic, catanionic, zwitterionic (amphoteric), non-ionic surfactant, or combinations thereof. The surfactant may be used for better dye solubility, colloid stabilization of pigment particles in fluid, to lower interfacial tension and thereby decrease the voltage required to cause electrowetting, and/or to increase conductivity of the fluid.

The colored fluid may include the surfactant from 0% to 10% by weight of the pigment in the fluid.

The synergist that can be included in the colored fluid may be sulfonic acid, a metal salt of sulfonic acid, a salt of sulfonic acid with primary, secondary, tertiary, and quaternary amines; a sulfonamide, phthalimidomethyl, arylmethyl, alkyl amine, carboxylic acid, salts, amides and esters of carboxylic acids; a carbonyl, amidomethyl, alkylaminomethyl, arylalkyloxy, phenylthio and phenylamino derivatives of azo, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, pyranthrone pigments, or any mixtures thereof. The synergist can also be any commercial or modified direct, acid, cationic, reactive, vat, sulfur, and disperse dye or any combination thereof. The synergist may be used for pigment surface modification to stabilize pigment particles in the fluid, to improve rheological properties, and/or to increase conductivity of the fluid.

The colored fluid may include the synergist from 0% to 30% by weight of the pigment in the fluid.

The dispersant that can be included in the colored fluid may be selected from the following classes: anionic, cationic, and zwitterionic (amphoteric), non-ionic polymer that is block, random, comb polymer or co-polymer; or combinations thereof.

The dispersants, which may optionally be used with synergists, assist in stabilizing the pigment in the fluid. The colored fluid may include dispersants from 0% to 200% by weight of the pigment in the fluid.

In one embodiment, an electrowetting or electrofluidic device includes a clear non-polar fluid and a colored polar fluid, which is colored with an oligomeric and/or polymeric dye. In another embodiment, an electrowetting or electrofluidic device includes a clear polar fluid and a colored non-polar fluid, which is colored with an oligomeric and/or polymeric dye. In still another embodiment, an electrowetting or electrofluidic device includes colored polar and colored non-polar fluids, with each colored with an oligomeric and/or polymeric dye that does not diffuse into the other fluid.

In yet another embodiment, the colored fluid includes at least one polar or non-polar solvent, at least one oligomeric and/or polymeric dye in the solvent, and at least one pigment, which is stabilized by the oligomeric and/or polymeric dye, wherein the pigment has a mean weight diameter in a range of 10-200 nm. In another example, the pigment has a mean weight diameter in a range of 20-100 nm.

In another embodiment, a plurality of colored fluids can be combined together. For example, a colored fluid having a polar solvent and a polymeric and/or oligomeric dye in the polar solvent may be combined with a colored fluid having a non-polar solvent and a polymeric and/or oligomeric dye in the non-polar solvent, with each including additional optional components as discussed above.

The colored polar fluid may have an electrical conductivity no greater than 3000 µS/cm. In another example, the colored polar fluid may have an electrical conductivity in a range from about 0.1 µS/cm to 3000 µS/cm. In another example, the colored polar fluid has an electrical conductivity from about 5 µS/cm up to 3000 µS/cm. In yet another example, the colored polar fluid has an electrical conductivity of about 5 µS/cm up to about 500 µS/cm. In still another example, the colored polar fluid has an electrical conductivity from about 10 µS/cm up to about 300 µS/cm. If conductivity is too low, a higher voltage has to be applied for proper device function. If conductivity is too high, the probability of dielectric breakdown is increased.

If necessary, conductivity can be readily adjusted by the addition of appropriate salts; however, the total concentration of any present monatomic ions with radii smaller than 2.0 Å and polyatomic ions smaller than 1.45 Å should not exceed 500 ppm total to prevent electrical breakdown of a dielectric in the device employing the fluid, at an applied voltage up to three times the theoretical operating voltage of the dielectric, which is further discussed below. In one example, the content of specified ion species should not exceed 300 ppm total. In still another example, the content of specified ion species should not exceed 100 ppm total.

In addition, the colored polar fluid has a surface tension from about 15 dynes/cm to about 90 dynes/cm at 25° C. In another example, the surface tension is from about 25 dynes/cm to about 75 dynes/cm at 25° C.

The conductivity of the colored non-polar fluid should not exceed the value of about $5 \times 10^{-3}$ µS/cm insofar as higher conductivity can be detrimental for fluid and device performance.

The colored fluids can exhibit stability in a temperature range of −40° C. to 80° C. In one example, the stability lasts at least four weeks.

The dynamic viscosity of the colored fluids can be from 0.5 cPs to 2,000 cPs at 25° C. In another example, the dynamic viscosity is from 0.1 cPs to 500 cPs at 25° C. In still another example, the dynamic viscosity is from 0.5 cPs to 100 cPs at 25° C.

The interfacial tension between the polar fluid and the non-polar fluid can be from about 2 to about 70 dynes/cm. In another example, the interfacial tension between the polar fluid and the non-polar fluid can be about 5 to about 55 dynes/cm. If interfacial tension is too low, mixing of the polar fluid and non-polar fluid will occur, and if too high, higher voltages will be required for electrowetting response.

The colored fluids having the non-polar solvent should not be miscible with the colored fluids having the polar solvent, and should not form a stable emulsion therewith. To that end, the non-polar solvent should have a cross-solubility level with the polar solvent that is less than about 10%. In one example, the cross-solubility is less than about 1%. In addition, components of the colored polar fluid should not migrate into the colored non-polar fluid or vice versa.

In preparing the colored fluids, the components can be mixed in a vessel equipped with a high-speed stirrer with rotation velocity in a range of 500-12,000 RPM. The mixture may then be milled utilizing known milling equipment, such as but not limited to a rotating ball mill, vibration mill, agitated horizontal or vertical media mill, basket mill, rotor/stator type machines, or attritors. The mixture may be milled by batch operation or by way of recirculation and/or discrete pass. Any known type and size of media can be employed, for example, glass, ceramics, sand, polymeric, and metal media with sizes in a range from 15 µm to about 10 cm. Typical mills include those manufactured by Eiger, Netzsch, Buhler, Premier, Hockmeyer, Chicago Boiler, Drais, Union Process, etc. Alternatively, the colored fluids may be produced on batch process equipment, such as a rotating ball mill or an agitated ball mill. The former is typified by those provided by Paul-O-Abbe; the latter is typified by those supplied by Union Process. Media size for either may range in size as noted above, and media shape may be circular, regular, irregular, or a mixture thereof. The colored fluids may also be prepared on any high-energy disperser with a shear mechanism, such as an IKA Works, Baker-Perkins, sigma blade mixer, etc. The colored fluids may optionally be filtered or/and centrifuged to remove large pigment particles, broken media, or contaminants. Other methods of preparation known in the art can also be employed.

The viscosity of the colored fluids is measured with a Brookfield Viscometer LVDV-II+Pro at T=25° C., rotation speed 30 RPM, and spindle number 18. Particle size distribution is determined using Nanotrac™ 250, NPA 250 (Microtrac, Inc.) and Microtrac™ UPA (Microtrac, Inc.). Interfacial tension for colored fluids is measured using a drop tensiometer IFT Tracker™ (Teclis). The tensiometer uses drop shape analysis to calculate surface tension or interfacial tension where drop shape is determined by the forces of surface tension and gravity acting on the drop. Either a pendant drop or a rising drop configuration is used; the configuration was determined by the specific gravities and optical characteristics of fluids. The dielectric constant is measured at 25° C. using a Scientifica 870 Liquid Dielectric Constant Meter (Princeton Instruments).

The electrical conductivity for colored fluids was measured at 25° C. with a conductivity meter capable of measuring the desired range of conductivity, for example VWR model number 23226, Oakton® Acorn Con 6, and Liquid Conductivity Picosiemens/Meter, Model L40 (Wolfson Electronics)

Colored fluids were tested for electrowetting capability by evaluating change in contact angle on a hydrophobic dielectric and electrode substrate with voltage application. Indium tin oxide (ITO) coated glass was covered with a combination of Parylene C dielectric and Cytonix Fluoropel 1601V hydrophobic fluoropolymer as the ambient. Alternately, the dielectric layer may consist of $Al_2O_3$ and Asahi Cytop CTL-809M hydrophobic fluoropolymer. A conductive wire attached at one point to the ITO layer of the substrate served as the ground electrode. The substrate was submerged in a transparent non-polar solvent and a drop of colored fluid having a polar fluid was placed on the surface. Direct or alternating current in increments of 2V was supplied to the drop through a tungsten cat whisker probe and the contact angle of the drop at each voltage was recorded and calculated using VCA Optima software program (AST Products). A fluid was considered electrowetting capable if the contact angle decreased upon application of voltage so that the final contact angle was less than 90°. See Balaji Raj et al., "Ion and Liquid Dependent Dielectric Failure in Electrowetting Systems", Langmuir|3b2|ver. 9|Aug. 13, 2009, the contents of which is incorporated by reference herein in its entirety. In addition, colored polar fluids were measured without conductivity adjustment provided fluid conductivity was not less than 25 µS/cm.

Colored fluids were also tested for their tendency to cause dielectric failure, also referred to as dielectric breakdown. The probability of dielectric failure or breakdown might greatly increase in a presence of small ionic species in the colored fluid which could migrate into or/and through a dielectric layer. The $SnO_2$:$In_2O_3$ coated glass was covered with a thin dielectric layer, which may be $Al_2O_3$ with Asahi Cytop fluoropolymer or Parylene with FluoroPel fluoropolymer. A 1 µL drop of the fluid to be tested was placed on the substrate and a tungsten probe was positioned in the drop. Current was measured while completing direct current (DC) voltage sweeps from –99 V to 99 V. Dielectric failure was indicated by a current greater than 1 µA or an exponential increase in current. See Balaji Raj et al., "Ion and Liquid Dependent Dielectric Failure in Electrowetting Systems", Langmuir|3b2|ver. 9|Aug. 8, 2009, the contents of which is incorporated by reference herein in its entirety. For the purpose of this invention, the fluid was considered to pass the test if dielectric breakdown did not occur at an applied voltage up to three times the theoretical operating voltage for the desired dielectric. Three to five drops were tested for each solution for repeatability. For some examples, the worst result for each solution was presented.

The theoretical operating voltage for a dielectric was calculated with the following equation, using an IFT value of 7 dynes/cm, an electrowetting angle of 75 degrees, and a Young's angle of 180 degrees.

$$V_O = \sqrt{\frac{(\cos(\theta_V) - \cos(\theta_Y)) * 2 * \gamma_{NP} * d}{\varepsilon_0 * \varepsilon_r}}$$

Where $V_O$ is the operating voltage, $\theta_V$ is the electrowetting angle, $\theta_Y$ is the Young's angle, $\gamma_{NP}$ is the interfacial tension between the polar and non-polar fluids, $\varepsilon_0$ is the permittivity constant, $\varepsilon_r$ is the relative dielectric permittivity, and d is the thickness of the dielectric. The colored fluid should not result in dielectric breakdown as tested with the specified method at an applied voltage up to three times the theoretical operating voltage for the desired dielectric as calculated hereby.

Ion content was measured by elemental analysis using inductively coupled plasma spectroscopy (ICP). Samples were prepared for metal content by digestion in concentrated nitric acid and then by dilution to 5% acid concentration in deionized water. The sample was then introduced to a Thermo Scientific iCAP 6000 ICP-OES instrument to identify and quantify the total elemental content including non-ionic species of metals, metalloids, and non-metals such as phosphorus, sulfur and selenium. When the content of such elements, including but not limited to sodium, magnesium, calcium, iron, aluminum, and potassium, is determined by ICP, the upper limit of the total element content is established by summation. Ion content as defined here is known to be lower than the elemental analysis, thus establishing the upper limit of the ionic content. In addition, total halogen (bromine, chlorine) content was determined by oxidation. To determine total halogen, the sample was oxidized in a Schöniger Oxidation Flask and the evolved halogen was absorbed into an alkali solution. The halogen was is then precipitated from this solution and determined gravimetrically. Polyatomic ions can be measured through common analytical techniques specific to the ionic species. These include but are not limited to pH, titrimetric methods, colorimetric methods, spectroscopic methods, gravimetric methods, or/and mass spectrometry.

EXAMPLES

The following examples illustrate details of the present invention and are not intended to limit the spirit and the scope of the invention. Unless otherwise indicated, % and parts always denote % and parts by weight.

Example 1

Yellow Oligomeric Dye for Non-Polar Fluid 43 parts of 2-(4-carboxyphenylazo) acetoacetanilide and 238 parts of ortho-chlorotoluene were mixed under nitrogen purge. 20 parts of thionyl chloride and 1.5 parts of dimethylformamide were then added. The reaction mixture was heated to 90° C. over three hours and maintained at this temperature for one hour. The excess of thionyl chloride was removed by distillation and then 385 parts of polyisobutylamine Kerocom PIBA 03 (available from BASF) were added and a vacuum applied while stirring at 90° C. for 3 hours. At this stage, the temperature was raised up to 120° C. and maintained for five hours and then the solvent was distilled under vacuum. After cooling to room temperature, the viscous yellow fluid was discharged. The oligomeric dye was identified as 4-[(E)-(2,4-dioxopentan-3-yl)diazenyl]-N-polyisobutylbenzamide (mw=1700), which corresponds to formula (1) $Q[X—(Y)_l]_m$, where Q is a monoazo pigment residue; X is CONH; l is 1; m is 1, and Y is a polyisobutylamine. The solubility of the oligomeric dye in tetradecane was at least 20% by wt.

Example 2

Red Oligomeric Dye for Non-Polar Fluid 176 parts of polyisobutylamine Kerocom PIBA 03 (BASF), 12.5 parts of quinizarine, and 12.3 parts of leucoquinizarin were mixed for 20 minutes under nitrogen flow, heated up to 70° C. and stirred for two hours at 70° C. The temperature then was raised up to 130° C. and mixture was stirred over two hours at 130° C. and four hours at 150° C. without nitrogen flow. At this point, no particles of starting materials were detected and the color of the reaction mass changed from orange to dark red. The hot fluid was discharged from the reactor. The oligomeric dye was identified as 1-hydroxy-4-(polyisobutylamino)anthracene-9,10-dion (mw=1700), which corresponds to formula (1) $Q[X—(Y)_l]_m$, where Q is an anthraquinone residue; X is NH; l is 1; m is 1, and Y is a polyisobutylamine. The yield of oligomeric dye was about 200 parts and it demonstrated solubility up to 40% by wt in tetradecane.

Example 3

Red Oligomeric Dye for Non-Polar Fluid

In a four necked flask, 10 parts of 3,4,9,10-perylene tetracarboxylic acid dianhydride, 1.1 parts of zinc acetate dihydrite, 85 parts of polyisobutylamine Kerocom PIBA 03 (BASF), and 100 parts of N-methylpyrrolidone were charged. The reaction mixture was heated to 220° C. under nitrogen flow and stirred at this temperature for 16 hours. Viscous dark red liquid was discharge from the reactor after cooling and drowned into 700 parts of water. The product was collected by filtration and washed with water and then with isopropanol, and dried at 85° C. under vacuum. The oligomeric dye was identified as perylentetracarboxylic acid-bis-(polyisobutyl)-imide (mw=1700), which corresponds to formula (1) $Q[X—(Y)_l]_m$, where Q is a perylene pigment residue; X is =N—; l is 1; m is 2, and Y is a polyisobutylamine. The solubility of the oligomeric dye of the example in tetradecane was at least 20% by wt.

Example 4

Blue Oligomeric Dye for Non-Polar Fluid 80 parts of 35% aqueous press-cake of freshly made copper phthalocyanine sulfonyl chloride with substitution level of about 1.2-groups in a form of 35% water based press-cake were slowly added to the mixture of 85 parts of polyisobutylamine Kerocom PIBA 03 (BASF), 100 parts of isopropanol, 100 parts of iced water, and 15 part of sodium carbonate at 5° C., stirred for two hours. The reaction mixture was heated up to 50° C., stirred for two hours, and the temperature was raised to 80° C. and the mixture was held at this temperate for three hours. The reaction product was filtered, washed with water and then with isopropanol to yield very viscous dark blue mass. The oligomeric dye was identified as N-(polyisobutyl)-copper phthalocyaninesulfonamide (mw=1700), which corresponds to formula (1) $Q[X—(Y)_l]_m$, where Q is a phthalocyanine pigment residue; X is $SO_2NH$; l is 1; m is 1-2, and Y is a polyisobutylamine. The solubility of the oligomeric dye of the example in tetradecane is at least 20% by wt.

The oligomeric dyes of Example 1-4 were purified by means of column chromatography. The mixture of chloroform/2-heptanone 70/30 parts as eluent and Silica gel 60 as a stationary phase were utilized. After separation, the solvents were evaporated and oligomeric dyes were dried under vacuum at 80° C. for 24 hours and then dissolved in tetradecane to provide 10% solutions that were tested for electrowetting performance and breakdown as described above. The oligomeric dyes of Example 1-4 demonstrated satisfactory electrowetting performance and did not cause breakdown of the dielectric at direct current (DC) voltage sweeps from −99 V to 99 V.

Example 5

Yellow Oligomeric Dye for Polar Fluid 43 parts of 2-(4-carboxyphenylazo) acetoacetanilide and 238 parts of ortho-chlorotoluene were mixed under nitrogen purge. 20 parts of thionyl chloride and 1.5 parts of dimethylformamide were then added. The reaction mixture was heated to 90° C. over three hours and maintained at this temperature for one hour. The excess of thionyl chloride was removed by distillation and then 400 parts of Surfonamine B-200 (Huntsman) were added and a vacuum applied while stirring at 90° C. for 3 hours. At this stage, the temperature was raised up to 120° C. and maintained for five hours and then the solvent was distilled under vacuum. After cooling to room temperature, the viscous yellow fluid was discharged. The oligomeric dye was identified as 4-[(E)-(2,4-dioxopentan-3-yl)diazenyl]-N-polyetherbenzamide (mw=2000), which corresponds to formula (1) $Q[X—(Y)_l]_m$, where Q is a monoazo pigment residue; X is CONH; l is 1; m is 1, and Y is a polyethoxylatedpropoxylated oligomeric chain. The solubility of the oligomeric dye of the example in gamma-butyrolactone was at least 20% by wt.

Example 6

Yellow Oligomeric Dye for Polar Fluid 43 parts of 2-(4-carboxyphenylazo) acetoacetanilide and 238 parts of ortho-chlorotoluene were mixed under nitrogen purge. 20 parts of thionyl chloride and 1.5 parts of dimethylformamide were then added. The reaction mixture was heated to 90° C. over three hours and maintained at this temperature for one hour. The excess of thionyl chloride was removed by distillation and then 200 parts of Surfonamine L-100 (Huntsman) were added and a vacuum applied while stirring at 90° C. for 3 hours. At this stage, the temperature was raised up to 120° C. and maintained for five hours and then the solvent was distilled under vacuum. After cooling to room temperature, the viscous yellow fluid was discharged. The oligomeric dye was identified as 4-[(E)-(2,4-dioxopentan-3-yl)diazenyl]-N-polyetherbenzamide (mw=1000), which corresponds to formula (1) $Q[X—(Y)_l]_m$, where Q is a monoazo pigment residue; X is CONH; l is 1; m is 1, and Y is a polyethoxylatedpropoxylated oligomeric chain. The solubility of the oligomeric dye of the example in propylene glycol was at least 20% by wt.

Example 7

Yellow Oligomeric Dye for Polar Fluid 43 parts of 2-(4-carboxyphenylazo) acetoacetanilide and 238 parts of ortho-chlorotoluene were mixed under nitrogen purge. 20 parts of thionyl chloride and 1.5 parts of dimethylformamide were then added. The reaction mixture was heated to 90° C. over three hours and maintained at this temperature for one hour. The excess of thionyl chloride was removed by distillation and then 400 parts of Surfonamine L-207 (Huntsman) were added and a vacuum applied while stirring at 90° C. for 3 hours. At this stage, the temperature was raised up to 120° C. and maintained for five hours and then the solvent was distilled under vacuum. After cooling to room temperature, the viscous yellow fluid was discharged. The oligomeric dye was identified as 4-[(E)-(2,4-dioxopentan-3-yl)diazenyl]-N-polyetherbenzamide (mw=2000), which corresponds to formula (1) Q[X—(Y)$_l$]$_m$, where Q is a monoazo pigment residue; X is CONH; l is 1; m is 1, and Y is a polyethoxylatedpropoxylated oligomeric chain. The solubility of the oligomeric dye of the example in a mixture of propylene glycol/water, 80 parts/20 parts, was at least 20% by wt.

Example 8

Red Oligomeric Dye for Polar Fluid

In a four necked flask, 10 parts of 3,4,9,10-perylene tetracarboxylic acid dianhydride, 1.1 parts of zinc acetate dihydrite, 90 parts of Surfonamine B-200 (Huntsman), and 100 parts of N-methylpyrrolidone were charged. The reaction mixture was heated to 220° C. under nitrogen flow and stirred at this temperature for 16 hours. Viscous dark red liquid was discharge from the reactor after cooling and drowned into 700 parts of water. The product was collected by filtration and washed with water and then with mixture of water and isopropanol, dried at 85° C. under vacuum. The oligomeric dye was identified as perylentetracarboxylic acid-bis-(polyether)-imide (mw=2000), which corresponds to formula (1) Q[X—(Y)$_l$]$_m$, where Q is a perylene pigment residue; X is =N—; l is 1; m is 2, and Y is a polyethoxylatedpropoxylated oligomeric chain. The solubility of the oligomeric dye of the example in propylene carbonate was at least 20% by wt.

Example 9

Blue Oligomeric Dye for Polar Fluid 80 parts of 35% aqueous press-cake of freshly made copper phthalocyanine sulfonyl chloride with substitution level of about 1.2-groups in a form of 35% water based press-cake were slowly added to the mixture of 95 parts of Surfonamine B-200 (Huntsman), 100 parts of isopropanol, 100 parts of iced water, and 15 part of sodium carbonate at 5° C., and stirred for two hours. The reaction mixture was heated up to 50° C., stirred for two hours, and the temperature was raised to 80° C. and the mixture was held at this temperate for three hours. The reaction product was filtered, washed with water and then with a mixture of water and isopropanol to yield viscous dark blue mass. The oligomeric dye was identified as N-(polyether)-copper phthalocyaninesulfonamide (mw=2000), which corresponds to formula (1) Q[X—(Y)$_l$]$_m$, where Q is a phthalocyanine pigment residue; X is SO$_2$NH; l is 1; m is 1-2, and Y is a polyethoxylatedpropoxylated oligomeric chain. The solubility of the oligomeric dye of the example in gamma-butyrolactone was at least 20% by wt.

Example 10

Blue Pigmented Non-Polar Fluid Stabilized with Blue Oligomeric Dye 5 parts of C.I. Pigment Blue 15:3 (Sun Chemical), 1.5 part of oligomeric dye of Example 4, and 93.5 parts of tetradecane were premixed and then milled for one hour in Eiger mill with ceramic 0.8 mm media. Average particle size was 150 nm, and fluid conductivity was $4.4 \times 10^{-5}$ μS/cm. The fluid demonstrated a satisfactory electrowetting performance and did not cause breakdown of dielectric at direct current (DC) voltage sweeps from –99 V to 99 V.

Example 11

Blue Pigmented Polar Fluid Stabilized with Blue Oligomeric Dye 5 parts of C.I. Pigment Blue 15:3 (Sun Chemical), 1.5 part of oligomeric dye of Example 9, and 93.5 parts of gamma-butyrolactone were pre-mixed and then milled for one hour in Eiger mill with ceramic 0.8 mm media. Average particle size was 135 nm, and fluid conductivity was 8.5 μS/cm. The fluid demonstrated a satisfactory electrowetting performance and did not cause breakdown of dielectric at direct current (DC) voltage sweeps from –99 V to 99 V.

The various embodiments of the colored fluids of the invention may be used to supply coloration in electronic displays that operate by principles of electrowetting, electrofluidics, and/or electrophoresis, in color filters, in inkjet inks, in liquid toners, and in developers. In one specific embodiment, the colored fluids of the embodiments of the invention may be used in a display that operates according to electrowetting principles to create an image. Generally, an electrowetting device contains a plurality of individual pixels which are filled with a polar fluid and a non-polar fluid, which are immiscible. A voltage applied to, or removed from, each pixel causes movement of the polar fluid and thereby changes the appearance or state of the pixel from, for example, a colored state to a non-colored or transparent state.

Figure 1A:
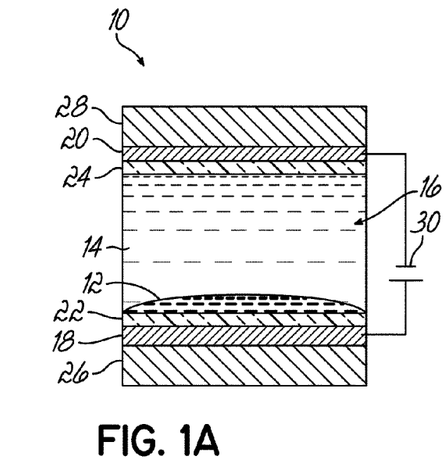
FIG. 1A shows a representative pixel 10 for use as an electrowetting device in a display.
Figure 1B:
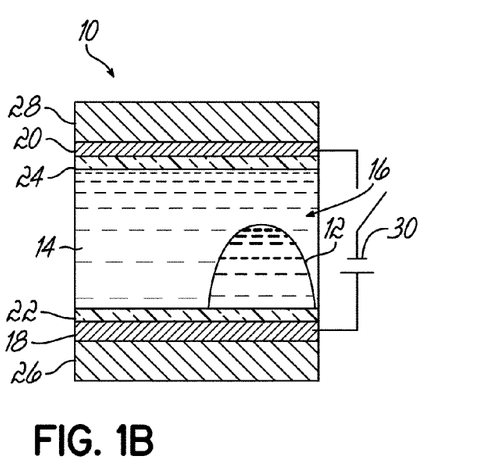
FIG. 1B shows a representative pixel 10 for use as an electrowetting device in a display where the potential difference is removed.

A representative pixel 10 for use as an electrowetting device in a display is shown as an embodiment of the invention in FIGS. 1A, 1B. A polar fluid 12 including at least one polar solvent and at least one oligomeric and/or polymeric dye consistent with one of the embodiments of the invention and a non-polar fluid 14 are confined inside a reservoir 16. The reservoir 16 is disposed between a first electrode 18 and a second electrode 20. Each of the electrodes 18, 20 is coated by a respective hydrophobic coating 22, 24 composed of an insulator, such as a fluoropolymer. The fluids 12, 14, electrodes 18, 20, and coatings 22, 24 in the stacked arrangement are supported by substrates 26, 28. A voltage source 30 is connected between the electrodes 18, 20 and is further connected with a control circuit (not shown) for the pixels of the display so that the pixel 10 can be addressed to change display states.

Light is supplied to the substrate 26 and directed through the stack of fluids 12, 14, electrodes 18, 20, coatings 22, 24, and substrate 28 to the environment exterior to the pixel 10. In the presence of a voltage applied by the voltage source 30 to the electrodes 18, 20 as shown in FIG. 1A, the polar fluid 12 forms a film over the hydrophobic coating 22 such that the pixel 10 has a visual appearance related to the coloration of the film. For example, if the polar fluid 12 is red in color, the light of a red wavelength is observed from the pixel 10. The color of polar fluid 12 is manifested in the light transmitted through the pixel 10 because of the increased surface area of the polar fluid 12 over the area of hydrophobic coating 22. When the potential difference is removed as shown in FIG. 1B, the polar fluid 12 responds by changing its shape and, thereby, its contact angle relative to the surface of the hydrophobic coating 22. The visible coloration of the polar fluid 12 is less apparent in the display state of FIG. 1B because less of the light is transmitted through the polar fluid 12 and, by comparison, more of the light is transmitted through the non-polar fluid 14. The non-polar fluid 14, which lacks the coloration of the polar fluid 12, preferentially wets most of the surface area of the hydrophobic coating 22 when the voltage is absent from the electrodes 18, in FIG. 1B. The non-polar fluid 14 may be non-colored or transparent. These two contrasting display states of the pixel 10 shown in FIGS. 1A, 1B, along with contrasting display states of other pixels (not shown) similar to pixel 10, may be used by the display to generate an image. When the potential difference is re-applied between the electrodes 18, 20 of the pixel 10, the polar film 12 will return from the display state of FIG. 1B to the display state of FIG. 1A.

A person having ordinary skill in the art will appreciate that the pixel 10 may have various alternative constructions and that the construction shown in FIGS. 1A, 1B may vary. In an alternative embodiment, the pixel 10 may be configured such that the applied potential difference causes the polar fluid 12 to form a film as in FIG. 1A and removal of the applied potential difference produces the state of increased contact angle in FIG. 1B. Alternatively, the polar fluid 12 may be moved by the potential difference to a position within the pixel 10 at which the polar fluid 12 is not visible and hidden from an observer.

Figure 2A:
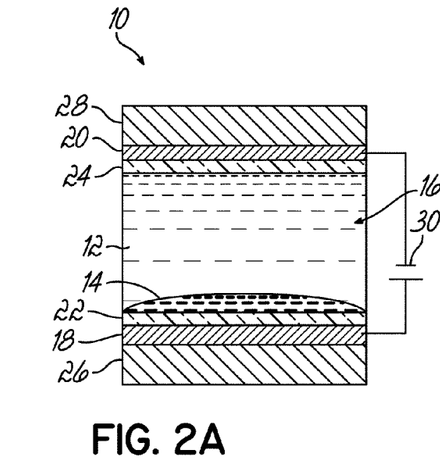
FIG. 2A shows a representative pixel 10 for use as an electrowetting device in a display.
Figure 2B:
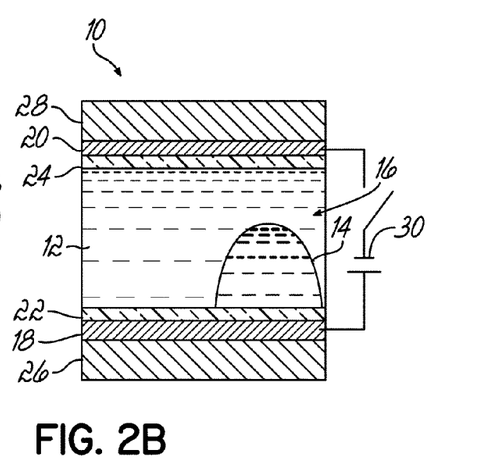
FIG. 2B shows a representative pixel 10 for use as an electrowetting device in a display where the potential difference is applied.

With reference to FIGS. 2A and 2B in which like reference numerals refer to like features in FIGS. 1A, 1B, a non-polar fluid 14, which includes at least one non-polar solvent and at least one oligomeric and/or polymeric dye consistent with one of the embodiments of the invention, may have a coloration, e.g., black, and may be used in the display pixel 10 along with the polar fluid 12 to create an image. In one embodiment, the black colored non-polar fluid 14 forms a film over the hydrophobic coating 22 as shown in FIG. 2A, which creates a dark, e.g., black, image area. When a potential difference is applied as in FIG. 2B, polar fluid 12 will wet the hydrophobic coating 22, and the non-polar 14 will be moved to, for example, form a droplet characterized by a decreased surface area. As a result, the color of the non-polar fluid 14 is confined to a small visible area of the pixel 10 and the appearance of the pixel 10 will primarily reflect the coloration of the polar fluid 12, which will be non-colored or transparent. These two contrasting display states of the pixel 10 shown in FIGS. 2A, 2B, along with contrasting display states of other pixels (not shown) similar to pixel 10, may be used by the display to generate an image.

Figure 3A:
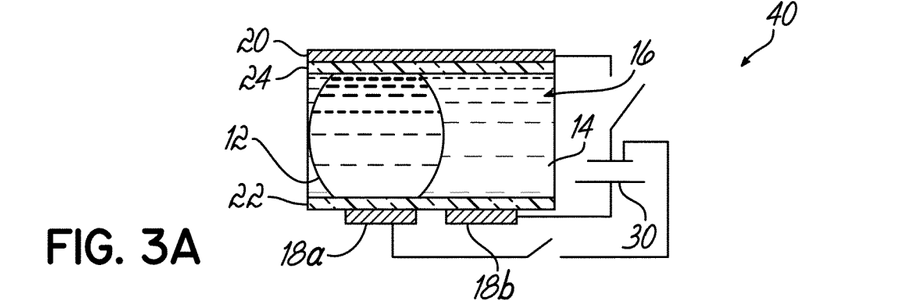
FIG. 3A shows a representative pixel 40 of a display where a droplet of polar fluid 12 is in a non-visible position.
Figure 3B:
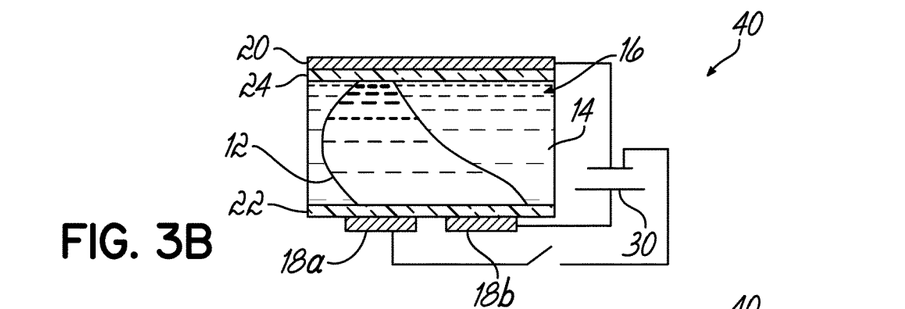
FIG. 3B shows a representative pixel 40 of a display where a droplet of polar fluid 12 is moving from a non-visible position to a visible position.
Figure 3C:
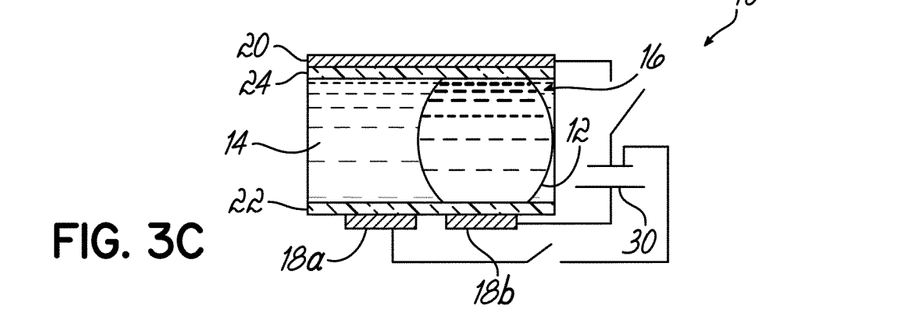
FIG. 3C shows a representative pixel 40 of a display where a droplet of polar fluid 12 is in a visible position.

With reference to FIGS. 3A-C in which like reference numerals refer to like features in FIGS. 1A, 1B and in accordance with an embodiment of the invention, the polar fluid 12 of the embodiments of the invention may be used in a pixel 40 of a display in which a droplet of the polar fluid 12 is moved within the pixel 40 from a non-visible position (FIG. 3A) to a visible position (FIG. 3C). Substrates similar to substrates 26, 28 are present but are omitted from the views for clarity. The transition of the polar fluid 12 between the non-visible and visible positions is apparent in FIG. 3B. The electrode 18 of pixel 40 is segmented into two discrete electrodes 18a, 18b. Electrode 18a is located in a portion of the pixel 40 for which the polar fluid 12 is hidden and not visible to an observer and electrode 18b is located in a portion of the pixel 40 for which the polar fluid 12 is visible to an observer due to the transmission of light through the polar fluid 12.

By switching the potential difference applied between the electrodes 18b, 20, the polar fluid 12 is moved from the non-visible position (FIG. 2A) to the visible position (FIG. 3B). In the visible position, light is transmitted through the polar fluid 12 and acquires a wavelength that reflects the coloration of the polar fluid 12. The light, after acquiring the characteristic coloration, is transmitted through the hydrophobic coating 24 and electrode 20 and out of the pixel 40 to an observer. The polar fluid 12 is returned from the visible position (FIG. 3C) to the non-visible position (FIG. 3A) to re-establish the initial display state by application of a potential difference to electrodes 18a, 20.

These two contrasting display states of the pixel 40 shown in FIGS. 3A, 3C, along with contrasting display states of other pixels (not shown) similar to pixel 40, may be used by the display to generate an image. In an alternative embodiment, the non-polar fluid 14 of the pixel 40 may be colored in addition to the coloration of the polar fluid 12. The embodiments of the polar fluid 12 described herein may be used in a device pixel, such as pixel 40, to improve image contrast.

Figure 4A:
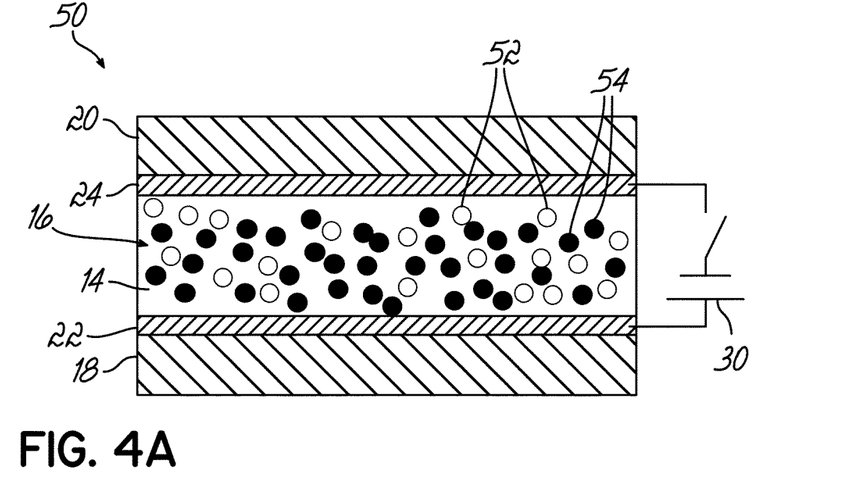
FIG. 4A shows a representative pixel 50 of a single particle type electrochromic display.
Figure 4B:
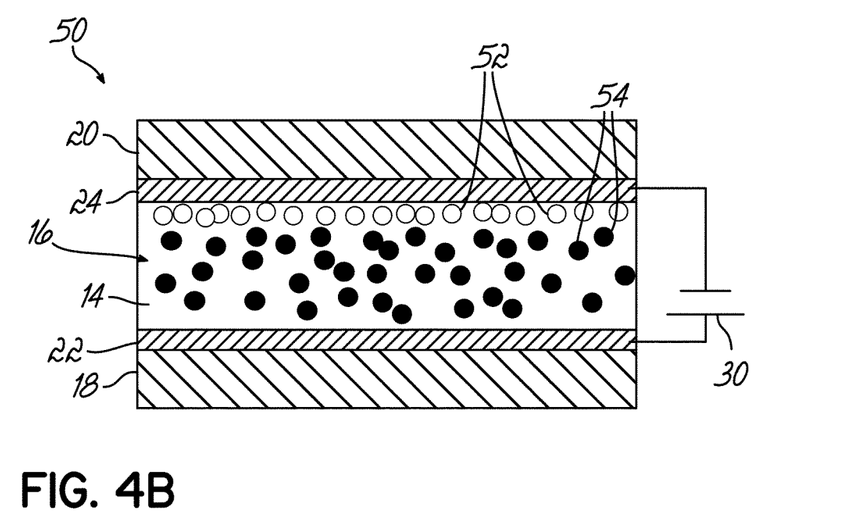
FIG. 4B shows a representative pixel 50 of a single particle type electrochromic display where a potential difference is applied between the electrodes 18, 20.

The colored non-polar fluid having a composition consistent with the embodiments of the invention can also be used in an electrophoretic device for a display. With reference to FIGS. 4A, 4B in which like reference numerals refer to like features in FIGS. 1A, 1B and in accordance with an embodiment of the invention, the non-polar fluid 14 may be used as the contrasting color for a pixel 50 of single particle type electrophoretic display. Specifically, charged particles 52 are suspended within a volume of non-polar fluid 14 and the pixel 50 has the appearance of the coloration of the non-polar fluid 14. When a potential difference is applied between the electrodes 18, 20 by a voltage from the voltage source 30, the charged particles 52 are electrostatically attracted toward at least one of the electrodes 18, 20, in this instance electrode 20 as shown in FIG. 4B. As a result of the redistribution of the charged particles 52 within the bulk of the colored non-polar fluid 14, the visible appearance of the pixel 50 changes to reflect the coloration of the charged particle 52 due to the change in display state. These two contrasting display states of the pixel 10 shown in FIGS. 4A, 4B, along with contrasting display states of other pixels (not shown) similar to pixel 50, may be used by the display to generate an image. Alternatively, when the dye in the non-polar fluid 14 are appropriately charged, the colored non-polar fluid 14 may be a contrasting color in a dual particle type display.

Accordingly, due to higher solubility, especially in non-polar solvents versus conventional dyes, the use of oligomeric or polymeric dyes offers desirable color strength and saturation, allowing for construction of thinner colored layers in a device, and the ability to achieve higher contrast ratios. Oligomeric and polymeric dyes also are less prone to crystallization in solution at lower temperature, e.g., less −40° C., and also less prone to diffusion from one fluid to another, due to their higher molecular weight, thereby providing improved device reliability. In addition, oligomeric and polymeric dyes offer improved solubility without increasing the content of small ions or the conductivity of the fluid, given that the solubilizing groups are preferably non-ionic. These properties offer improved performance over existing dyes and have desirable utility as dispersing and stabilizing agents for pigmented polar and non-polar fluids for electrowetting, electrophoretic, and electrofluidic chromatophore devices.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A colored fluid comprising:
at least one polar or non-polar solvent and at least one oligomeric and/or polymeric dye in the solvent, the oligomeric dye having at least one chromophore attached to one or more oligomeric chains and the polymeric dye having at least one chromophore attached to one or more oligomeric and/or polymeric chains, the dye further having a molecular weight from 400 to 100,000, solubility in the solvent of at least 5% by wt at 25° C., and a dynamic viscosity from 0.5 cPs to 2,000 cPs at 25° C., and wherein, if the solvent is the polar solvent, the colored fluid has a conductivity from about O·^S/cm to 3000 μ8Λ:1 η, a surface tension of 15 dynes/cm to 90 dynes/cm at 25° C., and a total content of monatomic ions with radii smaller than 2.0 A and polyatomic ions with radii smaller than 1.45 A less than 500 ppm, and, if the solvent is the non-polar solvent, the colored fluid has a conductivity less than 5×10⁻ S/cm and a surface tension of 10 dynes/cm to 40 dynes/cm at 25° C.

2. The colored fluid of claim 1 wherein the oligomeric or polymeric dye is defined by at least one of the following formulas:

$$Q[X-(Y)i]_m \quad (1)$$

$$(Q-X)_p-Z-(X-Y)_q \quad (2)$$

$$(Q-X)_p(X-Y)_q Z-Y-Z(X-Y)_q(X-Q)_p \quad (3)$$

$$(Q-X)_p(X-Y)_q Z-L-Z(X-Y)_q(X-Q)_p \quad (4)$$

$$Q-X-Y-X-Q \quad (5)$$

$$Z(X-Y-X-Q)_p \quad (6)$$

$$[(Y) iX]_m Q-X-Y-X-Q[X(Y)i]_m \quad (7)$$

$$X-Q-X-Y-[X-Q-X-Y]_k-X-Q-X-Y \quad (8)$$

$$Y(-X-Q)[Y(-X-Q)]_k Y(-X-Q)Y \quad (9)$$

$$Q[X_1^- Y_1^+]_m \quad (10)$$

$$Q[X_2^+ Y_2^-]_m \quad (11)$$

$$[Yi^+ Xf]m\, Q-X-Y-X-Q[X\, fYi^+]m \quad (12)$$

$$[Y_2-X_2^+]_m Q-X-Y-X-Q[X_2^+ Y_2^-]_m \quad (13)$$

$$Z\{X-Y-X-Q[XfY_1^+]_m\}_p \quad (14)$$

$$Z\{X-Y-X-Q[X_2^+ Y_2^-]_m\}_p \quad (15)$$

where Q is a chromophore;

X is R; RC(0)0; ROC(O); RC(0)NRi; RNRiC(O); SO₂NRi; SO₂; RO; RS; =N—; RNHC(0)NRi; RNHC(0)0; ROC(0)NH; RC(0)OCH₂CH(OH)CH₂; ROCH₂CH(OH)CH₂; or RNRiCH₂CH(OH)CH₂, where R is a single bond, alkyl, aryl, alkylaryl, or a heterocycle, and Ri is H, alkyl, aryl, or alkylaryl;

Y is an oligomer or polymer selected from a polyvinyl, polyvinylidene, polydiene, polyanhydride, polyalkyleneglycol, polyester, polyepoxy, polyurethane, polyamide, polyimide, polyuria, polycarbonate, polyacetal, polysulfone, polyaldehyde, polyketone, or random or block co-polymer thereof;

Z is a radical of 1,3,5- and 1,2,4-triazine, benzene-1,3,5-tricarboxylic acid, benzene-1,2,4-tricarboxy lie acid, benzene-2,3,5,6-tetracarboxylic acid, glycerol, pentaerythritol, dimethylol propionic acid, citric acid, isocitric acid, propane-1,2,3-tricarboxylic acid, mucic acid, malic acid, tartaric acid, 2,4-dihydroxybenzoic acid, 1,3, 5-triaminobenzene, 1,3,5-trihydroxybenzene, gallic acid, 2-amino-1,3-propanediol, or triethanolamine;

L is a single bond or a bifunctional linking group;

X is an anionic group of the chromophore;

$X_2^+$ is a cationic group of the chromophore;

$Yi^+$ is a cationic group of the oligomer or polymer;

$Y_2^-$ is an anionic group of the oligomer or polymer; and l is 1-2; m is 1-8; p and q are 1-4; p+q<5; and k is 0-500.

3. The colored fluid of claim 1 wherein the solvent is the polar solvent.

4. The colored fluid of claim 3 wherein the polar solvent has a dielectric constant greater than 10, a surface tension of 25 dynes/cm to 90 dynes/cm, a dynamic viscosity from 0.1 to 2,000 cPs at 25° C., and an electrowetting relative response (EWRR) to direct or alternating current of 30V in the range of 20-80%.

5. The colored fluid of claim 3 wherein the polar solvent is selected from water, glycols, polyglycols, alcohols, polyols, ethers, esters, ketals, lactones, ketones, lactams, pyrrolidones and polyvinylpyrrolidones, pyrrolidines, carbonates, ureas, sulfones, sulfoxides, amines, imines, amides, nitriles, carboxylic acids, acetals, carbamates, aldehydes, halogenated, thio, or nitro compounds, ionic fluids, or any mixtures thereof.

6. The colored fluid of claim 3 wherein the polar solvent is water, 1,2-propylene glycol, 1,3-propylene glycol, 1,4-butylene glycol, propylene carbonate, beta-propiolactone, beta-valerolactone, gamma-butyrolactone, gamma-valerorolactone, or any combination thereof.

7. The colored fluid of claim 2 wherein the solvent is the non-polar solvent.

8. The colored fluid of claim 7 wherein the non-polar solvent has a dielectric constant less than 10, a dynamic viscosity at 25° C. from 0.1 to 2,000 cPs, and a surface tension of 10 dynes/cm to 40 dynes/cm.

9. The colored fluid of claim 7 wherein the non-polar solvent is selected from linear or branched aliphatic or aromatic hydrocarbons, partially hydrogenated aromatic hydrocarbons, alicyclic or aromatic heterocyclic compounds or their derivatives containing a halogen, nitro, nitrozo, or cyano groups, fatty alcohols and carboxylic acids, esters, amides, or any mixtures thereof.

10. The colored fluid of claim 7 wherein the non-polar solvent is octane, nonane, decane, undecane, dodecane, tetradecane, tetralin, or decalin.

11. The colored fluid of claim 1 wherein the oligomeric and/or polymeric dye is present in an amount from about 0.01 weight to about 50% weight of the fluid and the polar or non-polar solvent is present in an amount from about 50% to about 99.99% weight of the fluid.

12. The colored fluid of claim 1 further comprising a pigment.

13. The colored fluid of claim 12 wherein the pigment has a particle size from 10 to 200 nm.

14. The colored fluid of claim 12 wherein the oligomeric and/or polymeric dye is present in an amount from 0.01% to 40% weight of the fluid, the pigment is present in an amount from 0.01% to 30% by weight of the fluid, and the polar or non-polar solvent is present in an amount from 40% to 99.98% weight of the fluid.

15. The colored fluid of claim 1 wherein the dye is a fluorescent dye.

16. An electro wetting or electrofluidic device including the colored fluid of claim 1.

17. The device of claim 16 further comprising a clear polar or non-polar fluid.

18. The device of claim 16 wherein the colored fluid includes the polar solvent to define a colored polar fluid and further comprising another colored fluid of claim 1, which includes the non-polar solvent thereby defining a colored non-polar fluid.

19. An electrophoretic device including the colored fluid of claim 1, which includes the non-polar solvent thereby defining a non-polar fluid.

20. A pixel for a display including the colored fluid of claim 1.

21. A method for changing a display state of a pixel for a display, the method comprising:
- applying a potential difference to a reservoir of the pixel that includes the colored fluid of claim 1 via a plurality of electrodes to create a change in the display state of the pixel by moving or changing the shape of the colored fluid.

* * * * *